United States Patent [19]

Rosenthal, Jr.

[11] 3,829,721

[45] Aug. 13, 1974

[54] AIR FLOW BAFFLE CONSTRUCTION FOR ELECTRIC MOTOR DEVICES

[75] Inventor: Francis Joseph Rosenthal, Jr., Fork, Md.

[73] Assignee: The Black and Decker Manufacturing Company, Towson, Md.

[22] Filed: July 30, 1973

[21] Appl. No.: 383,704

[52] U.S. Cl. ............... 310/47, 310/62, 415/219 C
[51] Int. Cl. ............................................. H02k 9/06
[58] Field of Search ............. 310/47, 58, 59, 62, 63, 310/50

[56] References Cited
UNITED STATES PATENTS

| | | | |
|---|---|---|---|
| 2,406,704 | 8/1946 | Mossay et al. | 310/62 X |
| 3,245,610 | 4/1966 | Sebok et al. | 310/63 X |
| 3,502,915 | 3/1970 | Moret et al. | 310/47 |

Primary Examiner—A. D. Pellinen
Attorney, Agent, or Firm—Leonard Bloom; Joseph R. Slotnik; Edward D. Murphy

[57] ABSTRACT

A fan baffle in the housing of electrically-operated devices, such as power tools, for directing cooling air through the housing, wherein the baffle includes intentional flashing about its periphery forming an improved air seal with the housing insuring against the build-up of a conductive path from the field coil of the motor by ambient graphite carried in the cooling air.

4 Claims, 6 Drawing Figures

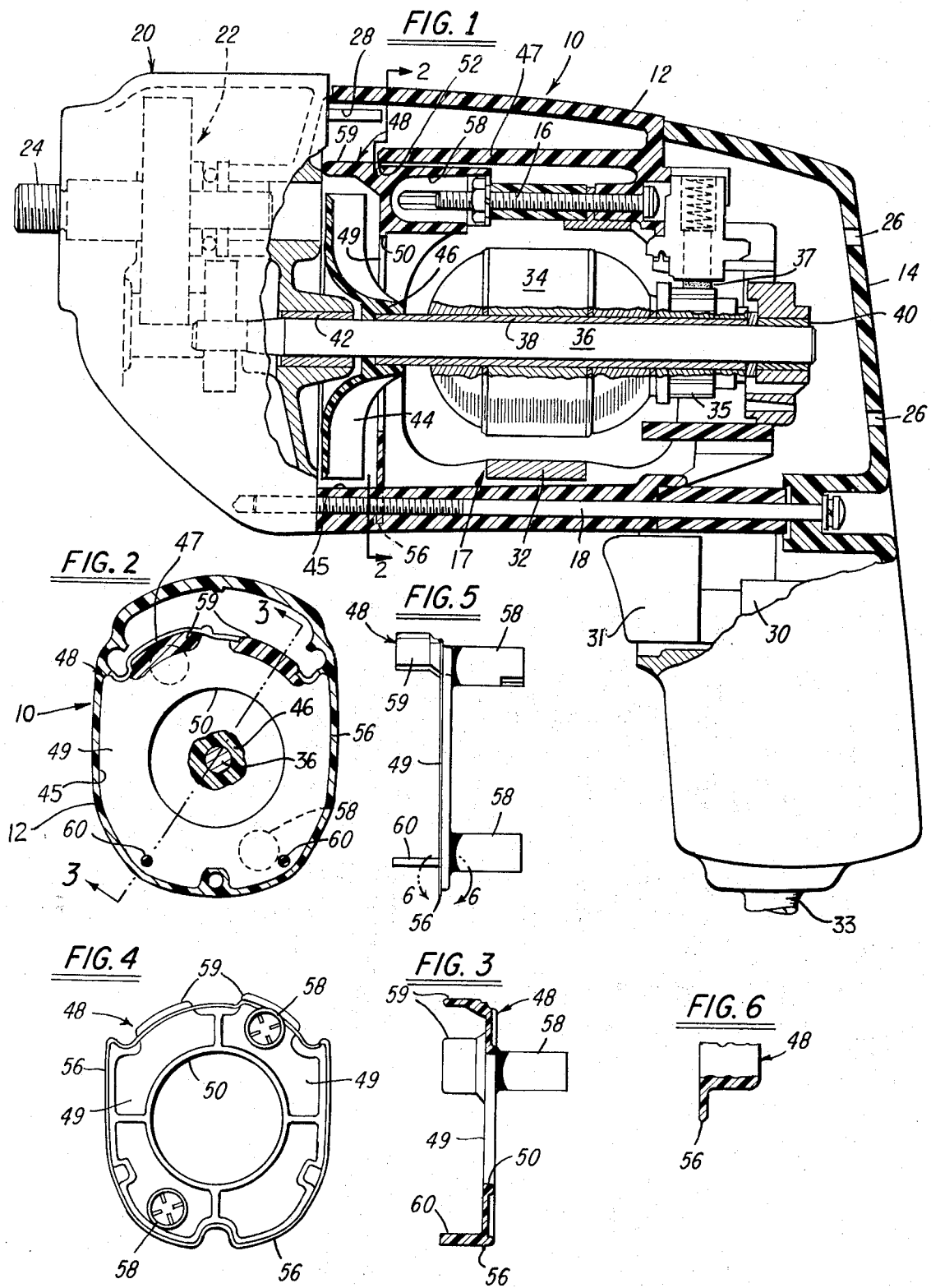

3,829,721

AIR FLOW BAFFLE CONSTRUCTION FOR ELECTRIC MOTOR DEVICES

BACKGROUND OF THE INVENTION

1. Field of the Invention

This invention relates generally to electrically-operated devices, for example, portable power tools and more particularly to an improved motor housing and fan baffle construction and method of sealing the same.

2. Description of the Problems Giving Rise to the Invention

There has been a continuing search for improved insulation against electric shocks to users of electric powered devices, such as power tools. Conventionally, the motor armature shaft in these devices has mounted thereon a fan for drawing or pushing air through apertures of the tool housing. See, for example, the U.S. Pat. No. 3,432,703 to Sheps, et al. It is conventional, in these devices to provide baffling to insure that air is directed to the portions to be cooled, i.e., through the armature and over bearings for the armature shaft. When molding baffles from a plastic, for example, peripheral flash or feather edge often remains after the molding process. Conventionally, this flash is trimmed from the article after molding and this step requires time and tooling and adds to the cost of the product.

In the use of these electric powered devices, their commutator brushes, which are generally constructed of graphite, wear and a fine powder of graphite (an electrical conductor) is carried through the motor housing with the cooling air. It will be appreciated that this graphite can, if unchecked, form a current conducting path from, for example, the field coil to a forward metal housing of the tool, or to air openings in the tool housing. Further, unless the periphery of the baffle is held to its critical design dimensions, there is a possibility of air leaks between the edge of the baffle and the adjacent portions of the housing with which it is intended to seal. Accordingly, this can lead to short circuiting of the cooling air and resultant inefficient motor cooling.

SUMMARY OF THE INVENTION

In accordance with the main objects of this invention, there is provided an electrically powered device such as a portable electric tool using a fan to move cooling air therethrough, and having an improved baffle which insures sealing at its peripheral edges to insure against air short circuiting and, more importantly, to prevent a potential electrically conductive path from graphite build-up to the field coil; and a method of forming an air cooling path in this type of device including intentionally constructing a baffle with flash or a feathered edge which is deformed when installed in a cooperating housing to sealingly engage against conforming portions of the housing.

In accordance with this invention, the "sealed" baffle and housing construction is achieved with a savings in cost and results in a more reliable and efficient product.

These, together with other and more specific, objects and advantages will become apparent from the following description of an examplary embodiment when taken with the drawing forming a part thereof in which:

BRIEF DESCRIPTION OF THE DRAWINGS

FIG. 1 is a longitudinal section through an electric tool incorporating the invention;

FIG. 2 is a sectional view of FIG. 1 taken along the line 2—2 thereof;

FIG. 3 is a section taken on the plane of line 3—3 of FIG. 2 and shown with the field case removed;

FIG. 4 is a rear elevational view of the baffle;

FIG. 5 is a side elevational view of the baffle; and

FIG. 6 is an enlarged fragmentary view of the portion of the periphery of the baffle identified at arrow 6 on FIG. 5.

DESCRIPTION OF A PREFERRED EMBODIMENT AND METHOD

Referring to the drawing and first considering FIG. 1, a portable electric power tool 10, for example, a drill, comprises a sectional housing including a molded-plastic field case 12 having a rear cover and handle 14 and a forward gear case 20 secured together by machine bolts 18. A motor 17 is supported in the field case 12 and has an output armature shaft 36 drivingly connected to an output spindle 24 through a transmission 22 in the gear case.

The handle 14 includes a trigger control switch 30 operated by a trigger 31 and adapted to be connected to a source of current (not shown) through a line cord 33, and to a field coil 32 and armature 34 forming part of the motor 17. The armature 34 includes a commutator 35 against which graphite brushes 37 are spring-urged (only one shown). The brushes 37 must be periodically replaced since they wear due to frictional engagement with the rotating commutator 35.

The armature shaft 36 has a tubular insulator 38 separating it from the armature windings, and the shaft 36 is journaled in a rear bearing 40 suitably supported in the field case 12, and in a bearing 42 supported in metal gear case 20. The shaft 36 has a fan 44 formed with a hub 46 fixed thereto which draws ambient cooling air in through inlet openings 26 and causes it to flow over bearing 40, past the commutator 35 and brushes 37, between the armature 34 and field coil 32. This cooling air is discharged by the fan 44 radially through discharge openings 28 in the field case 12.

Intermediate the fan 44 and the field coil 32 and armature 34 is a baffle 48 having a construction and interfitted with field case 12 in accordance with the invention. As shown, baffle 48 fits snugly into a complementary cavity defined by the internal wall 45 of the field case 12 and a web 47 formed integral with the field case 12. The baffle 48 has a generally planar face 49 formed with a central opening 50 circumposed about the hub 46 of the fan 44. The baffle 48 functions to direct cooling air moving from right to left through motor 17, as seen in FIG. 1, to flow through opening 50 toward the axis of the fan 44. This cooling air, after passing baffle 48, is discharged radially by fan 44 through openings 28.

It will be appreciated that if the fit between the periphery of baffle 48 and the inner surface of the field case is not perfect, some of the cooling air drawn through the field case 12 by the fan 44 can flow between the baffle 48 and field case 12. As described above, the brushes 37 wear with use of the motor 17 and emit fine, light particles of graphite as this wear progresses. These fine particles are picked up and carried by the cooling air flowing through the field case 12. Since the graphite particles are heavier than the cooling air, some are deposited along the internal surface of the field case 12. The baffle 48 acts as a barrier to these carbon particles and prevents them from forming a conductive electrical path to the discharge openings 28 and/or to the metal gear case 20. To insure that a good seal exists between the baffle 48 and the surrounding field case 12, to reduce the possibility of air leakage therepast, the baffle 48 is constructed and cooperates with the field case in a novel manner.

In accordance with the present invention, the baffle 48 is produced by molding a suitable plastic material such as polypropylene or the like to the configuration of a mold (not shown) and generally to the internal configuration of the field case 12. Customarily, this molding process results in a baffle 48 of the desired configuration within tolerance limitations. In some cases, these molded baffles 48 are formed with peripheral flash, shown at 56 in FIGS. 2–6, which occurs at the mold parting line. In those cases, it has been customary to trim this flash 56 from the baffle 48 after molding and before assembly to the field case 12. In other cases, baffles 48 could be molded with little or no flash. However, both cases required additional expense (either an extra step or a more costly molding sequence) and added to the overall cost of the resultant product.

In accordance with the present invention, the baffle 48 is molded with flash 56 and the latter is left intact thereon and is not trimmed. Thereafter, when the baffle 48 is assembled into place within the field case 12, the flash 56, which is somewhat deformable, flexes into gripping and sealing engagement with the internal surface of the field case 12. Thus, not only is a more effective seal provided at the juncture between the periphery of the baffle 48 and the internal surface of the field case 12 which prevents graphite particles from establishing a conductive path to an accessible or conductive portion of the device described above, but also this improvement is achieved at a cost savings which results from not having to trim the peripheral flash 56 as has been customary. Furthermore, the effective seal between the baffle 48 and the field case 12 enhances the cooling efficiency of the fan 44 which is beneficial to the life of the device.

By the foregoing, there has been disclosed improved interfitted fan baffle and motor housing or field case for electric power devices, such as electric power tools, calculated to fulfill the inventive objects hereinabove set forth. While a preferred embodiment of the present invention has been shown and described in detail herein, it will be appreciated that various additions, substitutions, modifications, and omissions may be made thereto without departing from the spirit of the invention.

I claim:

1. In a power tool comprising a housing including a field case enclosing an electric motor having a field coil, an armature journaled in said housing on a shaft including a commutator, brush assemblies engaging said commutator, a fan mounted on said shaft, said housing including means permitting air to be circulated therethrough by said fan, the improvement comprising a baffle interposed between said fan and said armature and including peripheral portions conforming to adjacent portions of said field case, said baffle including thin, flexible peripheral flashing normally extending beyond said conforming portions, said flashing being sealingly deformed into engagement with the field case.

2. The structure as claimed in claim 1 in which said baffle includes a central aperture, said fan including a hub extending partially into said baffle central aperture.

3. The structure as claimed in claim 1 in which said baffle includes laterally projecting support portions engaging the inner surface of casing and stabilizing the baffle therein.

4. In a power tool, comprising in combination a sectionalized housing including inlet and discharge openings for the movement of air therethrough, a motor in said housing, a fan driven by said motor and operable to move cooling air through said housing by way of said openings, and a baffle element extending transversely of the housing between said openings and peripherally sealing with correspondingly conformed portions of the housing, said baffle including thin, flexible peripheral flashing normally extending beyond said baffle to interfere with said portions of said housing, said flashing deformably and sealingly engaging said correspondingly conformed portions of the housing for preventing air passage at the periphery of the baffle element and preventing the movement of carbon dust beyond one side of the baffle element at said housing.

* * * * *